United States Patent [19]

De Waal

[11] Patent Number: 4,987,774

[45] Date of Patent: Jan. 29, 1991

[54] APPARATUS FOR MEASURING THE THICKNESS OF PISTON RIDER RINGS

[75] Inventor: Cornelis G. De Waal, Gouderak, Netherlands

[73] Assignee: Bently Nevada Europa B.V., Netherlands

[21] Appl. No.: 421,607

[22] Filed: Oct. 16, 1989

[51] Int. Cl.$^5$ .................................. G01M 19/00
[52] U.S. Cl. ..................................... 73/120; 92/5 R; 116/208
[58] Field of Search ................ 73/120; 116/208; 324/207.11, 207.24; 340/679, 682; 92/5 R

[56] References Cited

U.S. PATENT DOCUMENTS 2,468,509  4/1949  Naab .................................. 92/5 R X
4,107,603  8/1978  Slough .............................. 340/682 X

FOREIGN PATENT DOCUMENTS 1965892  2/1971  Fed. Rep. of Germany .
7610702  3/1977  Netherlands .

Primary Examiner—Jerry W. Myracle
Attorney, Agent, or Firm—Wegner, Cantor, Mueller & Player

[57] ABSTRACT

An apparatus for measuring the thickness of piston rider rings includes a probe disposed in the vicinity of the piston rod of a piston in a horizontal reciprocating machine to determine the vertical distance between the probe and the rod. Changes in the vertical distances are used to calculate wear of the piston rider rings. The apparatus may synchronize vertical distance measurements with the rotation of the crankshaft of the piston so that the distance measurements are taken at the same position of each stroke.

18 Claims, 3 Drawing Sheets

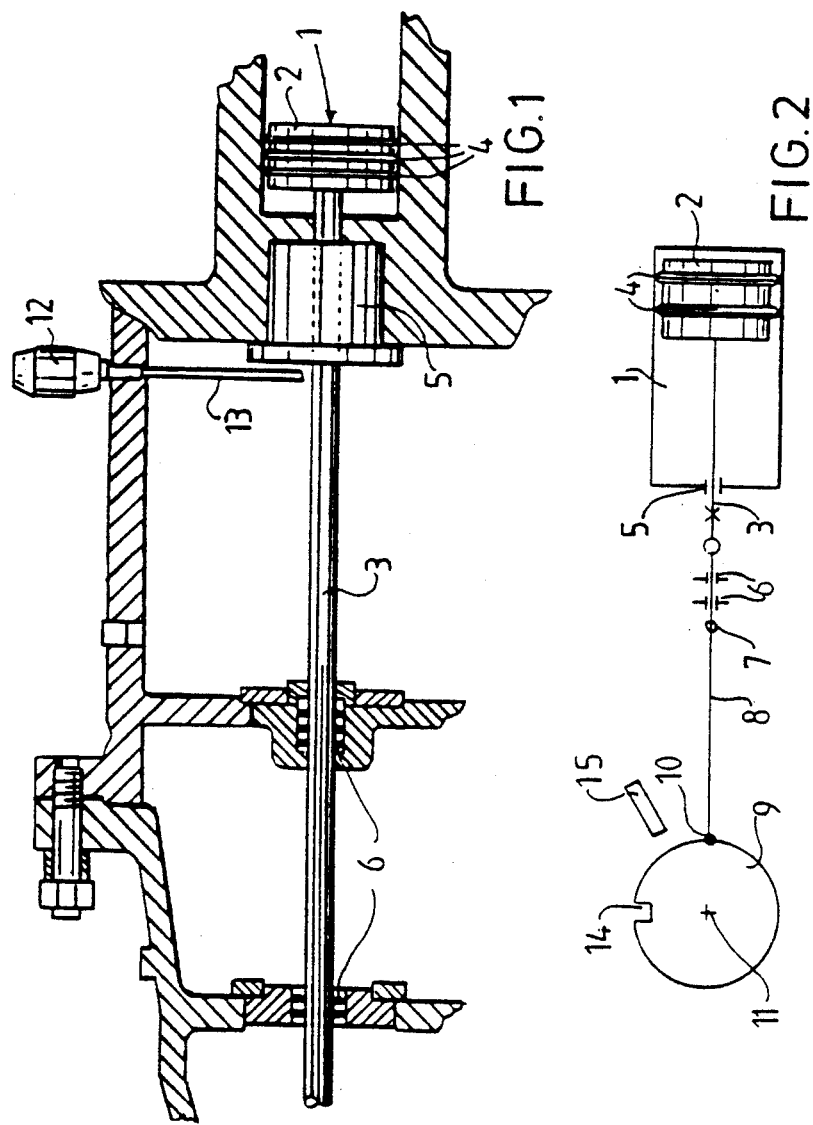

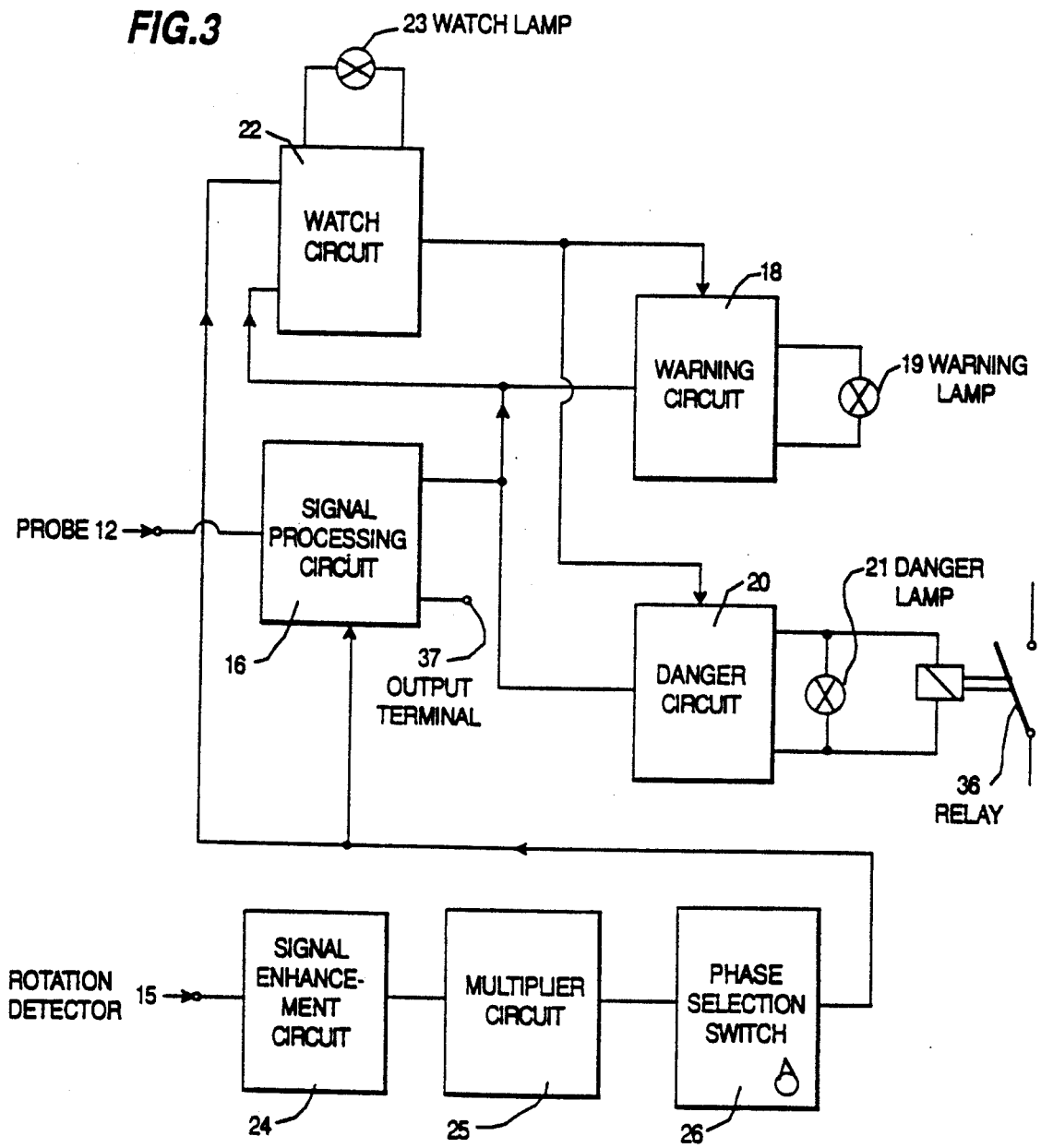

APPARATUS FOR MEASURING THE THICKNESS OF PISTON RIDER RINGS

The present invention relates to an apparatus for measuring the thickness of an element determining the vertical position of the piston in a cylinder, for instance of the piston rider ring of a horizontal reciprocating machine. Such measuring apparatuses are generally known.

Often a Vernier caliper or a micrometer is used to measure the thickness of the element determining the vertical position of a piston in the cylinder, for instance a piston rider ring.

It is, however, in this case necessary to stop the machine, of which the piston forms a part, to be able to determine the thickness of for instance the piston rider ring or the piston seal. Such horizontal reciprocating machines are oftern used in the process industry, in which stopping is very undesirable and brings about high costs.

The aim of the present invention is to provide such an apparatus, in which the machine, of which the piston forms a part, does not have to be stopped to be able to execute such a measurement.

This aim is reached in that such an apparatus comprises a probe for measuring the distance between the fixed probe and the piston rod, and by means for calculating the thickness of the element determining the vertical position of the piston in the cylinder from the signal representing the distance between the probe and the piston rod.

According to a preferred embodiment of the invention such a probe is contactless with the advantage, that the probe is not liable to wear.

According to a further preferred embodiment means have been provided for sampling the measuring signal and synchronisation with the rotation of the crank shaft driving the piston. Thus it becomes possible to execute the measurement in the same point of the piston stroke, so that the measurements of every stroke can be better compared and result in a more accurate indication of the thickness of the piston seal.

Subsequently the apparatus according to the present invention will be elucidated with the help of the accompanying drawings, in which:

FIG. 1 is a cross-sectional view of a horizontal compressor, in which a probe according to the present invention has been provided;

FIG. 2 is a schematic view of such a compressor;

FIG. 3 is a diagram of the electronic circuit according to the invention for processing the measuring signal from the probe.

Figure 4:
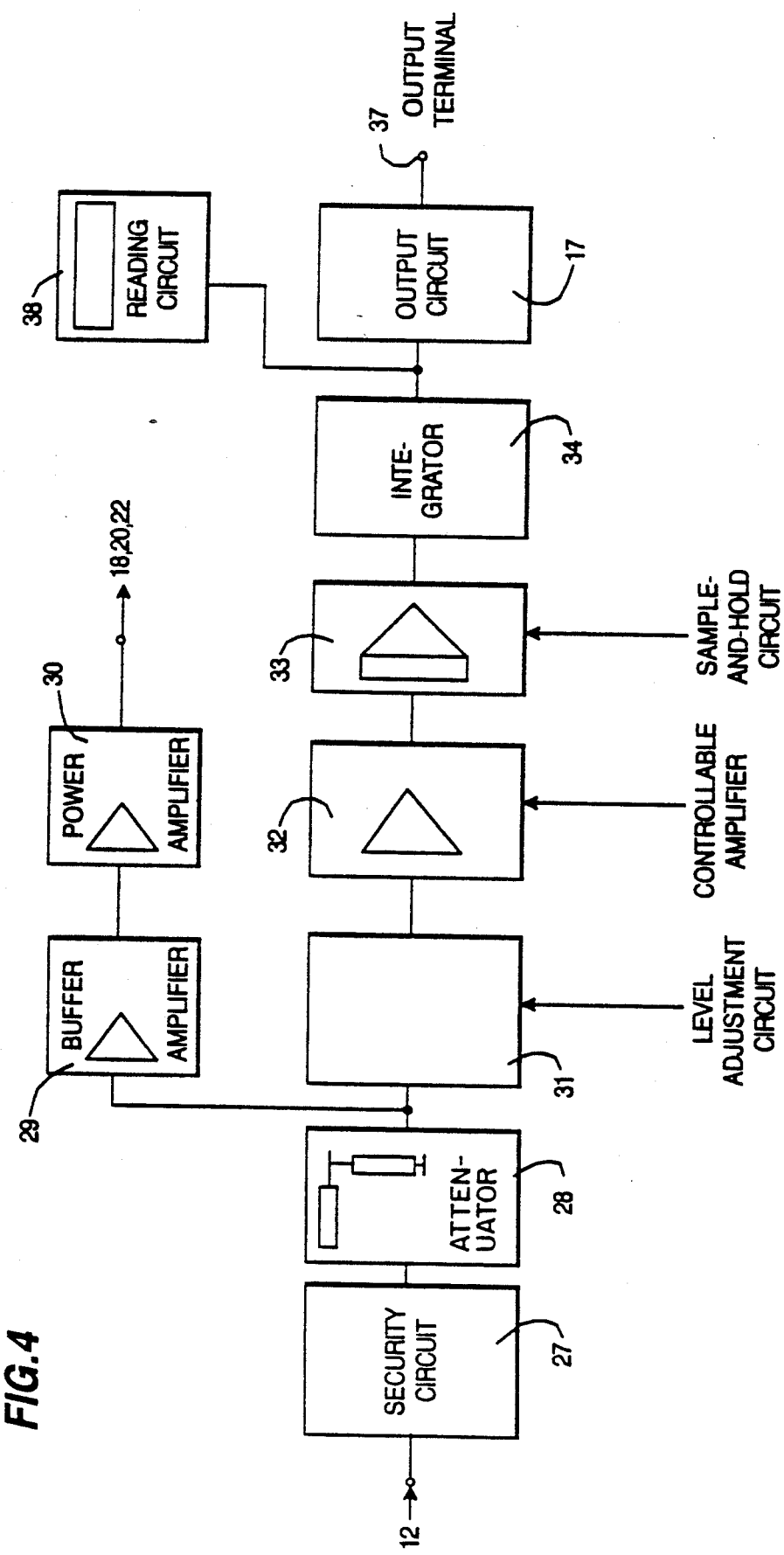
FIG. 4 is a diagram of the electronic signal processing circuit depicted in FIG. 3.

The high pressure compressor depicted in FIG. 1 comprises a cylinder 1, in which a piston 2 has been provided, which is movable in the cylinder 1 by means of a piston rod 3. The piston 3 comprises piston wear rings 4, which fit accurately in the cylinder 1. The piston rod 3 extends through a bearing 5 and through two seals 6. The piston rod is driven by a crank shaft and crank not depicted in FIG. 1 for a reciprocating movement.

FIG. 2 shows schematically the cylinder 1, the piston 2, the piston rod 3, the wear rings 4, the bearing 5, and the seals 6. Also FIG. 2 shows schematically the cross head 7, through which the piston rod 3 has been connected with the connecting rod 8 and the journal 10, through which the connecting rod 8 is connected with the crank 9, which has been provided on a crank shaft 11.

When the rider ring 4 wears, diminishing its diameter, the position of the piston 2 in the cylinder 1 will change; this will descend as caused by the gravity. Assuming that the bearing 5 allows for sufficient clearance, the position of the piston rod 3 will descend as well; in particular in the proximity of the piston. The apparatus according to the present invention uses this phenomenon by measuring the descending of the piston rod, and to convert it into an electrical signal.

Therefore a probe 12 has been provided comprising a measuring detector 13, of which the end is in the proximity of the piston rod 3. The probe delivers an electrical signal being proportional with the distance between the end of the detector 13 and the piston rod 3. Such probes are known and they are commercially available. Often the principle thereof lies in the measuring of variations of eddy current losses, which develop in the probe as a consequence of the change of distance between the probe and the piston rod.

The signal resulting from the probe 12 comprises a substantial amount of interference, of which the most substantial sources are:

As a consequence of the dynamic behaviour of several machine parts, a great number of vibrations will develop in the machine. As a consequence of these vibrations, the distance between the end of the probe and the piston rod will vary;

When compressing the gas being present in the cylinder 1, the piston rod 3 will bend, which will change the distance between the end of the detector 13 and the piston rod 3. When drawing back, the piston rod will stretch; and As a consequence of inhomogeneous properties of the material of the piston rods, the eddy current losses will not be constant over the whole piston stroke.

To diminish the influene of these interferences, a preferred embodiment of the present invention provides means for measuring the descent of the piston rod on the same part of the piston stroke.

Therefore the crank shaft 11, the crank 9 or another element, connected in rotation therewith comprises a cam or notch 14. In the proximity of the rotating element, a probe 15 has been provided, which delivers the signal once per piston stroke.

The signal resulting from the probe 12 is fed to a signal processing circuit 16, which will be closely elucidated with the help of FIG. 4.

The signal processing circuit 16 comprises a security circuit 27 to which the signal resulting from the probe 12 is fed to. The security circuit 27 provides that signals with a voltage level, which is too high or too low, are cut off. Then the signal is fed to an attenuator 28, which attenuates the signal to a suitable level. The signal thus attenuated is then fed via a buffer amplifier 29 to a power amplifier 30 connected thereafter.

The signal resulting from the attenuator 28 is also fed to a level adjustment circuit 31, for adjusting the DC-level of the signal. Then the signal is fed to a controllable amplifier 32, in which the signal is amplified with a controllable gain. The signal thus processed is fed to a sample-and hold-circuit 33, which also receives a sampling signal once per piston stroke, which signal comes from the rotation detector. The sampled signal is fed to an integrator 34, which essentially covers the function of a low pass filter. The output signal of the integrator 33 is fed to an output circuit 17 and to a reading circuit 38. In the output circuit 17 the processed signal is adapted for supplying to an oscilloscope, recorder or other registration apparatus and is fed to an output terminal 37. The reading circuit 38 indicates the rate of wear of the rider ring.

The output signal of the amplifier 30 is fed to a warning circuit 18, which comprises a warning lamp 19, which will light up when the output signal of the signal processing circuit 16 is larger than the predetermined value; i.e. that the rider ring wear has exceeded a threshold value. Of course the warning circuit can also comprise a relay instead of a warning lamp 19, to indicate the exceeding of a predetermined warning level.

The output signal of the signal processing circuit 16 is also fed to a danger circuit 20. This danger circuit 20 will make a danger lamp 21 light at the exceeding of a danger threshold value of the output signal of the processing circuit 16. Also this circuit will switch off the compressor, of which the piston forms a part by means of a relay 36 if by further wear of the rider rings irreparably damage can be caused.

To avoid lighting up unnecessarily the warning lamp 19 and the danger lamp 21 a watch circuit 22 watches the working of the whole system. Only when the output 16 and a sampling signal, which is to be described more closely, agrees the right values, this is indicated by the lighting of a watch lamp 23, so that the danger lamp 21 and the warning lamp 19 can be interpreted correctly. Also the output signal of the watch circuit 22 is fed to the warning circuit 18 and to the danger circuit to break off the working of these circuits when the working of the total circuit is not correct.

A signal coming from the rotation detector 15 is fed to a signal enhancement circuit 24, which adapts the level of the output circuit of the rotation detector, and makes the edges thereof more straight, and which normalizes the pulse lengths. The signal resulting from this signal enhancement circuit is then fed to a multiplier circuit 25, which delivers 256 pulses per turn of the crank shaft. Of course it is possible to have this circuit delivering a greater or smaller number of pulses per turn but experience has learned that 256 pulses is a suitable number. The total turn of the crank shaft is devided into 256 pieces. The signal is fed to a phase selection switch 26, which selects one of the 256 pieces. The selected pulse signal is then fed to the signal processing circuit 16 for executing the sampling.

By chosing one of 256 parts of the turn, it is possible to use a moment of sampling, in which the interference is already mentioned, have the smallest influence.

This can be determined by viewing the signal with the help of an oscilloscope and by selecting the moment of sampling such that the signal delivered by the probe is less subject to interference.

The embodiment described above relates to an apparatus for measuring rider ring wear. Of course such an apparatus can also be used for measuring the wear of the piston seal.

What is claimed is:

1. Apparatus for measuring the thickness of an element determining the vertical position of a piston in a cylinder of a horizontal reciprocating machine, comprising:

probe means comprising a contactless fixed probe for detecting a vertical distance between said contactless fixed probe and a rod of the piston and for producing an output signal representative of said distance; and means for calculating the thickness of the element determining the vertical position of the piston from the output signal of said probe means.

2. Apparatus for measuring the thickness of an element determining the vertical position of a piston in a cylinder of a horizontal reciprocating machine, comprising:

probe means comprising a fixed probe for detecting a distance between said fixed probe and a rod of the piston and for producing an output signal representative of said distance;

means for calculating the thickness of the element determining the vertical position of the piston from the output signal of said probe means; and means for sampling the output signal in synchronization with the rotation of a crankshaft driving the piston.

3. Apparatus according to claim 2, further comprising a pulse generator for detecting the rotation of the crank shaft and for supplying a synchronization signal in agreement therewith.

4. Apparatus according to claim 3, wherein the means for sampling has been adapted for holding the valve of the sample until the next sampling.

5. Apparatus according to claim 3, wherein after the means for sampling a low pass filter has been provided.

6. Apparatus according to claim 2, further comprising a phase shifter for shifting the phase of the synchronization signal.

7. Apparatus according to claim 6, wherein the means for sampling has been adapted for holding the value of the sample until the next sampling.

8. Apparatus according to claim 6, wherein after the means for sampling a low pass filter has been provided.

9. Apparatus according to claim 2, wherein the means for sampling has been adapted for holding the value of the sample until the next sampling.

10. Apparatus according to claim 9, wherein after the means for sampling a low pass filter, has been provided.

11. Apparatus according to one of the claim 2, wherein after means for sampling a low pass filter has been provided.

12. Apparatus according to claim 2 further comprising means for generating a warning signal when the output signal exceeds a predetermined first threshold level.

13. Apparatus according to claim 2, further comprising means for making the reciprocating machine stop when the output signal exceeds a predetermined second threshold level.

14. Apparatus as claimed in claim 2, further comprising output means for selectively applying a signal representative of the operation of the device to a visual display device.

15. Apparatus according to claim 1 further comprising means for generating a warning signal when the output signal exceeds a predetermined first threshold level.

16. Apparatus as claimed in claim 1, further comprising output means for selectively applying a signal representative of the operation of the device to a visual display device.

17. Apparatus for measuring the thickness of an element determining the vertical position of a piston in a cylinder of a horizontal reciprocating machine, comprising:

probe means comprising a fixed probe for detecting a distance between said fixed probe and a rod of the piston and for producing an output signal representative of said distance;

means for calculating the thickness of the element determining the vertical position of the piston from the output signal of said probe means; and means for making the reciprocating machine stop when the output signal exceeds a predetermined second threshold level.

18. Apparatus for measuring the thickness of an element determining the vertical of a piston in a cylinder of a horizontal reciprocating machine, comprising:

probe means comprising a contactless fixed probe for detecting a distance between said contactless fixed probe and a rod of the piston and for producing an output signal representative of said distance;

means for calculating the thickness of the element determining the vertical position of the piston from the output signal of said probe means; and means for sampling the output signal in synchronization with the rotation of a crankshaft driving the piston.

* * * * *